Figure 1:
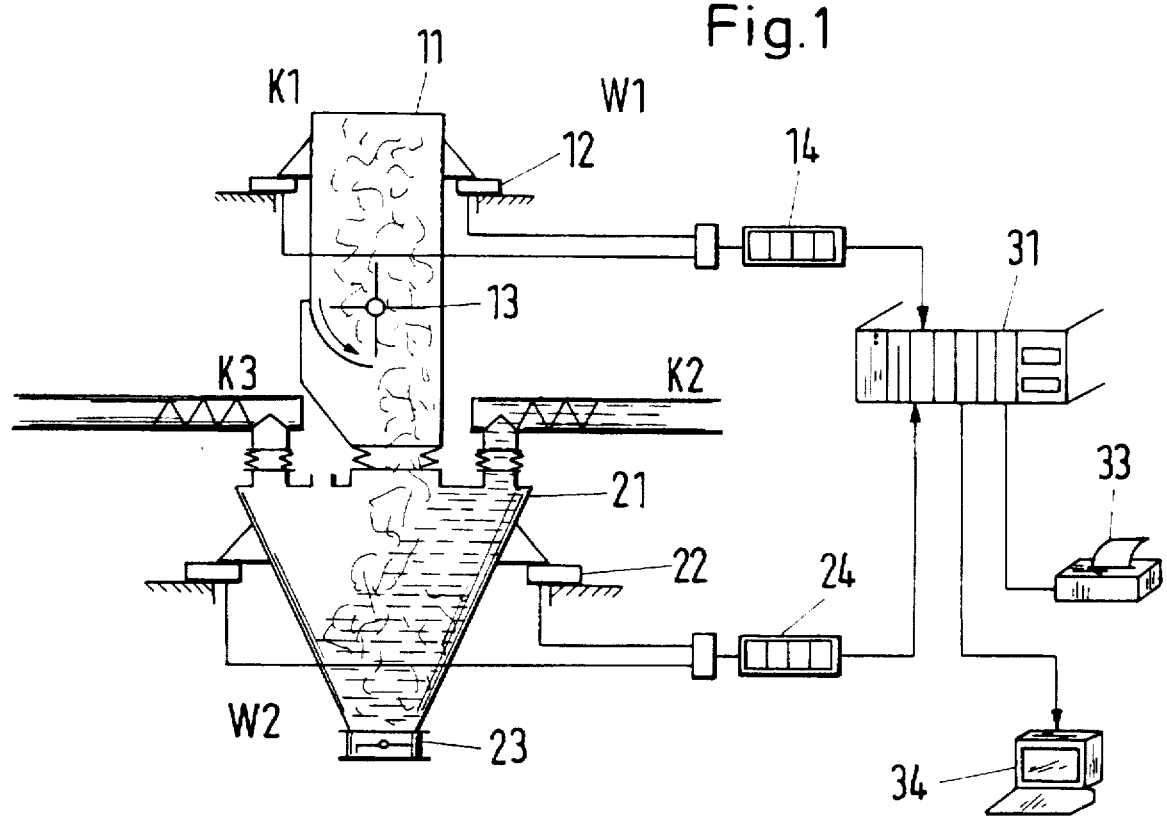

United States Patent [19]

Diem

[11] Patent Number: 5,753,868
[45] Date of Patent: May 19, 1998

[54] METHOD AND APPARATUS FOR GRAVIMETRIC DOSING AND MIXING OF AT LEAST TWO COMPONENTS

[75] Inventor: Winfried Diem, Mannheim, Germany

[73] Assignee: Maschinenfabrik Gustav Eirich, Hardheim, Germany

[21] Appl. No.: 227,711

[22] Filed: Apr. 14, 1994

[30] Foreign Application Priority Data

Apr. 15, 1993 [DE] Germany ............... 43 12 281.7

[51] Int. Cl.$^6$ ........................................... G01G 19/22
[52] U.S. Cl. ........................ 177/70; 177/1; 177/71; 177/116; 177/121; 222/57; 222/145.5
[58] Field of Search ................ 177/1, 70, 71, 177/116, 121; 222/55, 57, 77, 135, 145.5

[56] References Cited

U.S. PATENT DOCUMENTS

| 4,678,046 | 7/1987 | Mosher ............... 177/1 |
| 5,148,943 | 9/1992 | Moller ............... 222/1 |

FOREIGN PATENT DOCUMENTS

| 2517087 | 5/1983 | France . |
| 3742229 | 6/1989 | Germany . |
| 9101194 | 2/1993 | Netherlands . |

OTHER PUBLICATIONS

"Industrial Weighing and Proportioning Technology for Batching Plants", W. Mayerhauser, Technisches Messen, vol. 58, No. 5, May 1991, pp. 196–201.

*Primary Examiner*—Michael L. Gellner
*Assistant Examiner*—Shih-yung Hsieh
*Attorney, Agent, or Firm*—Paul & Paul

[57] ABSTRACT

The present invention relates to a method and an apparatus for gravimetric dosing and mixing of at least two components (K1, K2), wherein the parts by weight of the components (K1, K2) are calculated by weighing and both components (K1, K2) are mixed together in a container (21). In order to prepare a method and an apparatus whereby it is possible to mix together even components which are difficult to mix in accurate doses and uniformly and without excessively long mixing operations, it is proposed according to the invention that a first component (K1) is fed into a first weighing container (11), that a second component is fed into a second weighing container (21) continuously over a given period of time, during which time the first component (K1) is transferred at least in sections and simultaneously from the first weighing container (11) to the second weighing container (21) which receives the sum of the weights of the first and second components (K1, K2), wherein the relative parts of the first and second component (K1, K2) in the second weighing container (21) result from the reduction in weight of the contents of the first weighing container (11) and the sum of the weights of the two components (K1, K2) in the second weighing container (21), wherein two weighing containers (21) are provided accordingly for the apparatus, one of which is provided with a discharge device (13) which feeds the component (K1) out of the first weighing container to the other weighing container (21) and which is designed as a dosing device, wherein the other feed device (25) is designed as a dosing device for the second weighing container (2).

6 Claims, 2 Drawing Sheets

METHOD AND APPARATUS FOR GRAVIMETRIC DOSING AND MIXING OF AT LEAST TWO COMPONENTS

The present invention relates to a method and an apparatus for gravimetric dosing and mixing of at least two components wherein the parts by weight of the components are calculated by weighing and both components are mixed together in a common container. Therein, an appropriate apparatus has at least one weighing machine with a weighing container, feed devices for at least two different components to be mixed together and a discharge device on the weighing container.

These types of dosing methods which operate gravimetrically are generally known in the prior art. Therein, the individual components are usually filled one after the other into a weighing container, and are discharged therefrom after being weighed out, and are filled into a mixing container. If necessary, the weighing container can also itself be designed as a mixing container, so that the individual components are fed cumulatively into the weighing container and are then mixed together.

However, some mixing and dosing operations are difficult, e.g. those where at least one of the components to be dosed and mixed has very different physical properties from the rest of the components. This is the case with fibres or fibre-like material, for example, which is to be mixed with a liquid, a powder or a slip. Particularly with very light and loosely layered fibres, the problem arises as early as the dosing stage that the material is in no way inclined to slip down in the weighing container which is generally shaped like a funnel in the direction of an emptying opening and through the emptying opening. Instead, loosely layered fibres like this often form a relatively loose bond but one which is still sufficiently firm for the fibres, and form a block of fibres suited to the shape of the container, or at least connected bridges in the container which can often only be removed from the dosing container with difficulty, and often only by manual intervention. It is also often very difficult to mix these types of fibres in with other types of component, and to simultaneously mix up the corresponding components.

The present invention aims to remedy this by preparing a method and an apparatus making it possible to even mix together components which are difficult to mix in accurately doses and uniformly and without excessively long mixing operations.

With respect to the method, this problem is solved in that a first component is fed to a first weighing container, that a second component is fed continuously to a second weighing container during a given period of time, whilst at the same time the first component is transferred out of the first weighing container continuously to the second weighing container which determines the sum of the weights of the first and second components wherein the relative parts of the first and second components are deduced from the reduction in weight of the content of the first weighing container and the sum of the two components in the second weighing container. It will be appreciated that the relative part of the first and second components is purposefully adjusted in accordance with a given recipe, feed of one of the components being throttled or accelerated depending on how the weight reduction in the first weighing container and the weight increase in the second container develop.

With respect to the apparatus, the problem forming the basis of the invention is solved in that two weighing containers are provided, one of which is provided with a discharge device which opens into the other weighing container, and which is simultaneously designed as a dosing device, wherein the other feed device is designed as a dosing device for the second weighing container.

The way in which it is made practically possible by way of the apparatus according to the invention and by way of the claimed method to feed two components substantially simultaneously into one common container, the mixing operation in the second weighing container takes place already when the two components are being supplied, and in a very uniform manner, if the dosed quantities are adapted in accordance with the relative parts of the components continuously in accordance with the weight reduction of the first weighing container and the weight increase of the second weighing container. Therefore the subsequent actual mixing operation of the components is significantly reduced because at least two components are already present in a substantially uniform mixture, one of which is a component which would otherwise be relatively difficult to mix in. It will be appreciated that in the sense of the present invention the term, "continuous feed" also comprises an intermittent simultaneous or alternating feed, interrupted for a short time, of components into the second weighing container, provided that the components become mixed together or premixed solely by way of this method of feeding.

With respect to the problem of bridge formation and discharge of fibres and similar problematic material, the advantage exists that either the first weighing container can be specially fitted for discharging such problematic materials, or that these components can be fed directly to the second weighing container as second components, with mixing taking place automatically by simultaneously adding the first components from the first weighing container.

It is advantageous if the reduction in weight of the first weighing container or of the contents thereof and the increase in weight of the second weighing container or of the contents thereof are continuously calculated by comparing nominal and actual values, for example with the weight being measured at fixed short time intervals, and with the change in weight being derived per unit of time, in order to make a comparison of the nominal and actual values.

The two components do not necessarily have to be fed into the second weighing container continuously and simultaneously, but instead a similar result could be achieved by feeding smaller amounts of the first and second component alternatingly into the second weighing container, thus arranging these components so to speak in thin layers over one another which likewise considerably facilitates subsequent mixing compared with feeding both components completely separately.

In addition, a third component can also be fed into the second weighing container alternatingly with the second component, if the intention is to mix together more than two components by feeding them into the second weighing container. Similarly, it is possible to extend this method to more than three component(s). Therein, however, only small parts of the second or whatever component should be dosed, so that the components are changed over relatively quickly and the layers to be mixed together follow on relatively closely.

It can also be advantageous if one of the components is filled into the second weighing container with a certain lead in time, before the other component starts to be filled in simultaneously, wherein a time delay can also be provided for one or other of the components.

If, for example, powder or a fine granular material is mixed with fibres, then it can make sense if the filling operation of the fibres is given a lead in time because then powdery material or material with fine grains which is filled together with the fibres sinks between the intermediate spaces between the fibres anyway and becomes mixed with the bottom-most layer of fibres, wherein this material is not present in the higher fibre layers, so that at the end it can be expedient to have a time delay before the material with fine grains is filled. With other mixing operations it may make sense if the one component is introduced from the top and bottom through the other component, so that the same component is given appropriate leads and delays in time, wherein it is clear that the amount fed and the relative parts of the components must be in compliance with the desired recipe.

One embodiment of the apparatus according to the invention is expedient wherein the two weighing containers are arranged above one another, i.e. wherein the first weighing container is arranged above the second weighing container, so that a discharge opening can open at the bottom of the first weighing container directly into a corresponding feed opening on the cover of the second weighing container disposed beneath it. Therein, however, the discharge opening of the first weighing container and the corresponding feed opening of the second weighing container should be connected together by way of a flexible bellows element, so that no forces from the first weighing container are transferred to the second weighing container or to its cover, which could give a false weighing result for the two containers.

Depending on the type of component which is to be fed into the first weighing container, this latter can have a bucket wheel channelling means in the form of a discharge device or a special force discharge device for loose material which has a tendency to form bridges. In the latter case, in the preferred embodiment of the invention, the weighing container is designed with relatively steep walls which are preferably parallel, e.g. in the form of a cylindrical silo or the like, and it has an appropriate force discharge device which takes a considerable part of the volume or cross-section of the container. Clearly, other discharge devices, such as vibro channels, worms etc. can also be used instead of bucket wheel channelling means.

Adjacent to the feed opening from the first weighing container to the second weighing container, the second weighing container obviously also has a feed opening for the second component, and, in the preferred embodiment, also at least one further, or a plurality of further, feed openings for a third component, or for further components. It is also expedient if the feed openings for two components which are to be fed into the second weighing container simultaneously are relatively close together, and if the feed openings are also arranged on the cover, or, at least in the upper edge region of the second weighing container. The distance between the feed openings for the components which are to be fed simultaneously should therein preferably be less than the radius of the cover of the container. In addition, all feed devices should, for example, each be disposed on the corresponding feed opening on the cover of the container by way of a flexible bellows member, so as not to transfer any forces to the second weighing container. However, it is also possible to selectively suspend the cover as a whole from the feed devices for the second, third and other components, and for it to be connected to the second weighing container by way of a flexible bellows element or a loose guide means. Therein, the connection between the cover and the discharge opening of the first weighing container is provided likewise by a flexible bellows element, because no forces must be transferred from the cover and the feed devices onto the first weighing container to prevent a false weighing result.

One embodiment of the apparatus is preferred, wherein a control device is provided for the various feed devices for the individual components and for the discharge device of the first weighing container. A control device of this kind makes it possible to pre-program a desired recipe and to suitably control all the feed devices to the second weighing container in response to the measured results supplied by the weighing elements of the first and second weighing containers.

Figure 2:
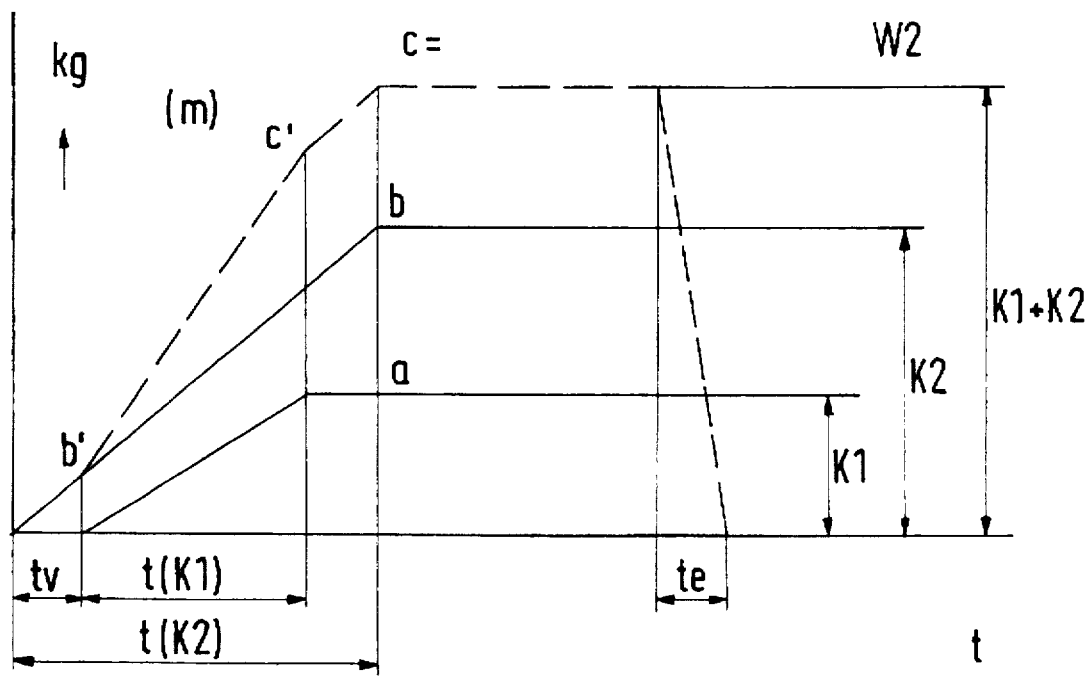
Figure 3:
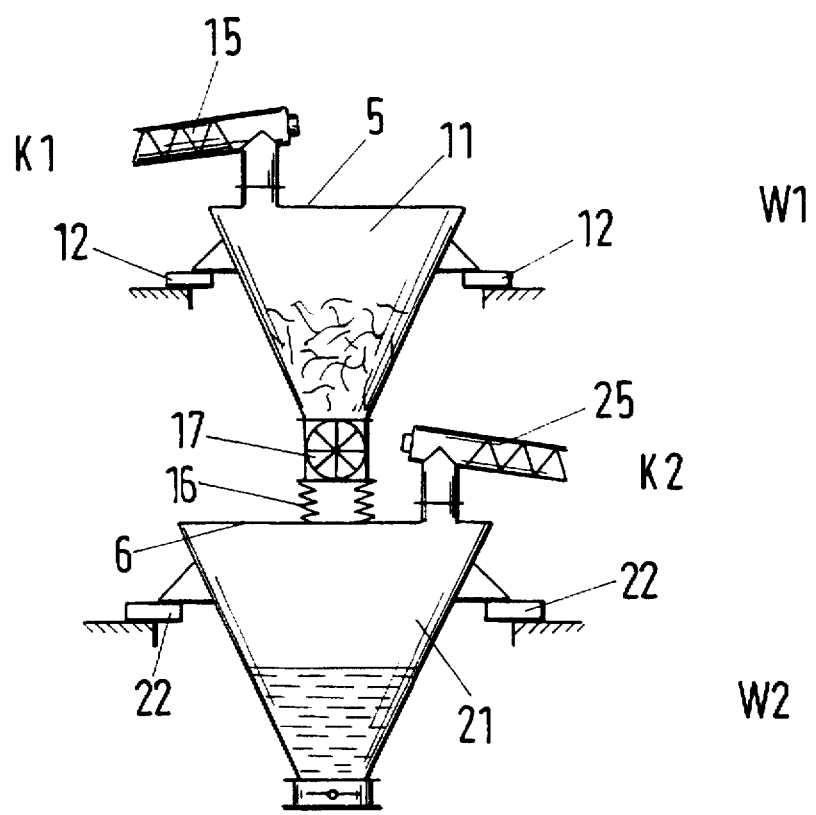

Further advantages, features and possible applications of the present invention will emerge clearly from the following description of preferred embodiments and from the associated drawings, wherein:

FIG. 1 is an illustration of an installation for mixing various components, having a first weighing container which is particularly designed for components which are difficult to dose, FIG. 2 illustrates the course of a dosing operation for two components, reproducing the signals of the first and second weighing container, and FIG. 3 is an illustration of the apparatus according to the invention in its simplest, most basic form.

Reference shall first of all be made to FIG. 3 where the main principles of the present invention shall be mentioned in the simplest variant.

To the top of FIG. 3 it is possible to see a weighing container 11 which is mounted on weighing measuring compartments 12 which may have expansion measurement strips. A feed device 15, shown in the form of a conveyer worm, is provided for a component K1 on the cover of the weighing container 11. The force uncoupling means between the feed device 15 and the cover 5 of the container 11 is not shown, which may be in the form of a bellows element in the pipe connection piece of the feed device 10, or in the form of a bellows element between the cover 5 and the container 11.

A discharge- and dosing device in the form of a bucket wheel channelling means is provided at the bottom of the funnel-like container 11, the rotational speed of which bucket wheel channelling means is controllable in order to be able to vary the dosed quantities and dosing speeds. The outlet of the bucket wheel channelling means 17 is, in turn, connected by way of a bellows element 16 to the cover 6 of the second weighing container 21. Again, the force uncoupling means between the feed device 25 for the second component K2 and the weighing container 21 is not explicitly shown, but is supposed to be provided, like the upper weighing container 11, either between the pipe connection piece of the feed device 25 and the cover 6, or between the cover 6 and the edge of the container 21. This latter is preferable if a larger number of feed devices is provided on the cover 6.

The course of a dosing- and mixing operation is such that a given quantity of first component K1 is first of all filled through the feed device 15 of the weighing container 11, and this given quantity results from the difference between the weight, calculated by the weighing compartments 12, of the weighing container 11 before and after being filled with component K1.

Apart from there being some temporal lead for one of the two components K1, K2, the weighing container 21 is then simultaneously filled by the feed device 25 for the component K2 and from the container 11 by means of the bucket wheel channelling means 17 for the component K1. The feed openings for the components K1, K2 on the cover 6 of the container 21 are arranged relatively close together, so that both components are already relatively well mixed together when they fall down in the container 21. If so desired, appropriate baffle plates or the like could also be provided on the cover 6 under the feed openings to ensure thorough mixing. Therein, by way of example, the component K2 can be a component which can only be mixed in with difficulty, and it is simultaneously mixed with component K1 by being simultaneously filled into the weighing container 21. It will be appreciated that therein component K1 is selected, if possible, in such a way that out of all other components in question which may be added later, it is the best to mix with component K2 for simultaneous feeding into the container 21. Thus, for example, it would be preferable to fill long smooth fibres which are difficult to mix simultaneously with a material which has somewhat coarse grains, instead of a sand-like material with fine grains which would trickle down between the smooth fibres and collect on the floor of the container W2, if it is possible to choose between different components in this way.

During the simultaneous filling of the weighing container 2, the changing weight both of the weighing container 1 and also of the weighing container 21 is detected by the weighing compartments 12 and 22. In this way it is possible to take the weight reduction of the weighing container 11 and the total weight increase of the weighing container 22 and use the difference between these two numerical values to calculate the weight of the component K2 supplied, so that both the relative and absolute parts of components K1 and K2 are known in the mixture present in the weighing container 21, and the feed rates can be adapted by way of the bucket wheel channelling means 17 or the feed device 25 in accordance with the desired recipe, if the measured actual values deviate from the nominal values.

FIG. 1 shows a corresponding installation which also illustrates the components for detecting the measured values, for evaluation and for control. The basic design is like that shown in FIG. 3, namely having an upper weighing container 11 and a bottom weighing container 21 which are connected together by way of a flexible bellows element without any substantial transfer of forces. The measuring compartments 12, 22 preferably have expansion measurement strips which deliver a relatively large voltage signal even if the elastic deformation of the weighing measuring compartments 12, 22 is only slight, so that changes in weight can be detected with great accuracy even with the slightest vertical movement of the containers 11, 21. Test amplifiers 14 and 24 relay the measured values which are concentrated and detected by the measuring compartments 12, 22 to a control- and monitoring means 31. A control- and monitoring means of this kind can be a micro-controlling means, a PC or a fixed programmed component. A control device 31 is preferred which can be programmed or controlled by way of a data input device or terminal 34.

Data is input into the terminal 34, for example, concerning the quantity of component K1 which is to be fed into the weighing container 11, the ratio in which the components K1 and K2 are mixed (possibly also an additional component K3), and the ratio in which they are to be fed into the weighing container 21. Likewise, data can be input concerning the speed at which the components K1, K2 are to be fed into the weighing container 21, and the total amount or total mass of mixture which should finally be present in the container 21, wherein it will be appreciated that the part of component K1 in this total quantity cannot exceed the amount previously present in the container 11. The control device 31 is therefore programmed in such a way that it checks the corresponding input values and gives an answerback signal if any inconsistencies emerge or if a specific recipe with a specific total amount cannot be obtained on the basis of the parameters which have been input.

After all the necessary parameters have been input and checked, it is possible for a corresponding print-out to be made by a printer 33, and the installation is then started after a temporal lead or by a direct command at the terminal 34. The control device then first of all takes the signals of the weighing compartments 12 and identifies them with a net zero weight. The control device then controls the feed device, not shown, for the component K1, so that the container 11 is first of all filled with component K1. It is clearly also possible for the weighing container to be charged manually with component K1 and for the charging to be effected by pushbutton controls, whereby the control device 31 uses the present actual value as a further basis. The discharge device 13 first of all remains out of operation. A discharge opening of the container 11 can, if necessary, also be closed by a slider, not shown. During the filling of the container 11, the control device 31 continuously detects the measured values taken by the weighing compartments 12 and stops the filling operation, as soon as the weighing compartments 12 have reached a signal level which corresponds to the input or programmed total quantity of the component K1 in the container 11. The following mixing- and filling operation in the container 21 shall be described with reference to the diagram of FIG. 2, wherein it is to be appreciated that deviations here are also possible. The curve b in FIG. 2 represents the total mass of the component K2 which is filled into the container 21, whilst the curve a represents the total mass of the component K1 which is filled into the container 21 which is detected in terms of measurement as the reduction in weight of the container 11. The curve c which coincides with the curve b for an initial period of time $t_v$ and which is also shown as a broken line gives the total net weight of the components K1 and K2 in the weighing container 21, which is calculated by the signals of the weighing compartments 22. The curve b therefore corresponds for periods of time in excess of $t_v$ not to a directly measured value, but to the difference between directly measured curves c and a, wherein the latter is measured reciprocally, i.e. as the weight reduction of the container 11.

As already evident from the preceding description, the diagram in FIG. 2 shows the mass of the respective components in the vertical extent and the sum over time on the horizontal axis.

As already mentioned, the control device 31 therefore first of all controls the feed device 25, so that for a short lead time $t_v$ only the component K2 is filled into the weighing container 21. This corresponds to the initial section of curve b which coincides with the curve c up to the point b'. After the period of time $t_v$, the discharge device 13 is also set in motion by the control device 31, so that the component K1 is then filled from the container 11 into the container 21, that is to say simultaneously with the component K2. The signals of the weighing compartments 22 over time then correspond to the curve c, marked by a broken line. Provided that the components K2 and K1 are simultaneously fed at a continuous speed, the curve c becomes accordingly steeper, i.e. its inclination results from the sum of the inclinations of curves a and b in that region between the points b' and c'. The supply by mass of the two components K2 and K1 is therein set by the control device 31 in accordance with a given or specially selected program in such a way that after a period of time which is characterised in the diagram as t(K1), the total amount of component K1 which has been filled into the container 21 corresponds to the given recipe. Therefore, after this period of time has elapsed and after the weighing compartments 12 have given a signal which corresponds to that amount, the discharge device 13 is stopped by the control device 31 and thus further feed of the component K1 into the container 21 is stopped. Therein, according to the diagram in FIG. 2, the feed speed for component K2 has been measured such that at that moment the amount of component K2 fed does not yet correspond to the total amount of component K1 or the recipe. According to curves c and b, feed of component K2 via the feed device 25 is continued until a time characterised on the horizontal axis as t(K2). At that moment, feed of the component K2 is also stopped, so that the total mass in the weighing container 21 then no longer changes, which is expressed by the horizontal curves a, b and c. If so desired, a further mixing operation can then be effected in the weighing container 21 using mechanical mixing elements. Otherwise, after a certain period of time, the mixture is let out by a discharge device or through a cover 23 at the bottom end of the container 21. The curve c which is drawn by a broken line and which falls away steeply during the period of time te corresponds to the course of measured signals of the weighing compartments 22.

The actual values of the measuring compartments 12 and 22 can be plotted on a graph in mass values in accordance with the recalculation, in order to give the actual course of the curves a and c, wherein the curve b can be calculated from the difference between curves c and a.

The entire course can be produced as a printout of numbers and columns, or it can be plotted on a graph by a printer 33 as a mixing protocol.

The method of the invention and corresponding apparatus makes it possible to produce mixtures of components during a relatively short period of time and with great efficiency, which was previously only possible with difficulty and with greater expenditure being made on energy.

I claim:

1. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time, the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; wherein the feeding of the first and second component is done by feeding the first and second components in short sections alternatingly to the second weighing container.

2. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time, the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; further including the step of continuously controlling the reduction in weight of the content of the first weighing container and the increase in weight of the content of the second weighing container by way of a comparison between nominal and actual values; wherein the feeding of the first and second component is done by feeding the first and second components in short sections alternatingly to the second weighing container.

3. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time, the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; further including the step of continuously controlling the reduction in weight of the content of the first weighing container and the increase in weight of the content of the second weighing container by way of a comparison between nominal and actual values; wherein a third component is fed into the second weighing container alternatingly with the second component.

4. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time. the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; further including the step of continuously controlling the reduction in weight of the first weighing container and the increase in weight of the content of the second weighing container by way of a comparison between nominal and actual values; wherein a third component is fed into the second weighing container alternatingly with the second component.

5. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time. the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; wherein the filling operation is carried out in such a way that the period of time for filling one of the components overlaps with the period of time for filling the other component by a lead $(t_v)$ and/or a delay $(t_n)$.

6. A method for gravimetric dosing and mixing of at least two components, wherein the parts by weight of the components are calculated by weighing and both components are mixed together in a container, comprising the steps of: (a) feeding a first component into a first weighing container; (b) feeding a second component into a second weighing container; (c) transferring said first component into said second weighing container with first dosing means and feeding said second component into said second weighing container with second dosing means over period of time. the dosing period for the second component substantially including a dosing period for said first component wherein feeding of said first component into said second weighing container only occurs while said second component is simultaneously fed thereto, and wherein streams of said first and second components emanating from said dosing means are directed in an interfering manner, such that mixing thereof occurs whilst said components are flowing into said second container, wherein the second weighing container receives the sum of the weights of the first and second components, while the relative portions of the first and second components in the second weighing container are the result of the amount of reduction in weight of the content of the first weighing container and the sum of the weights of the two components in the second weighing container; further including the step of continuously controlling the reduction in weight of the content of the first weighing container and the increase in weight if the content of the second weighing container by way of a comparison between nominal and actual values; wherein the filling operation is carried out in such way that the period of time for filling one of the components overlaps with the period of time for filling the other component by a lead $(t_v)$ and/or delay $(t_n)$.

* * * * *